United States Patent
Colbourne (10) Patent No.: US 9,998,253 B2
(45) Date of Patent: Jun. 12, 2018

(54) USE OF WAVELENGTH SELECTIVE SWITCH FOR A FEW-MODE FIBER

(71) Applicant: Lumentum Operations LLC, Milpitas, CA (US)

(72) Inventor: Paul Colbourne, Ottawa (CA)

(73) Assignee: Lumentum Operations LLC, Milpitas, CA (US)

(*) Notice: Subject to any disclaimer, the term of this patent is extended or adjusted under 35 U.S.C. 154(b) by 0 days. days.

(21) Appl. No.: 15/265,490

(22) Filed: Sep. 14, 2016

(65) Prior Publication Data

US 2017/0078040 A1    Mar. 16, 2017

Related U.S. Application Data

(60) Provisional application No. 62/219,431, filed on Sep. 16, 2015.

(51) Int. Cl.
| | |
|---|---|
| H04J 14/00 | (2006.01) |
| H04J 14/02 | (2006.01) |
| H04Q 11/00 | (2006.01) |
| H04B 10/2581 | (2013.01) |
| G02B 6/35 | (2006.01) |
| G02B 6/14 | (2006.01) |

(52) U.S. Cl.
CPC ............ *H04J 14/0212* (2013.01); *G02B 6/14* (2013.01); *G02B 6/3512* (2013.01); *G02B 6/3548* (2013.01); *H04B 10/2581* (2013.01); *H04Q 11/0066* (2013.01); *H04Q 2011/0016* (2013.01)

(58) Field of Classification Search
CPC ..... H04J 14/0212; G02B 6/14; G02B 6/3548; G02B 6/3512; H04B 10/2581; H04Q 11/0066; H04Q 2011/0016

USPC .......................................................... 398/49
See application file for complete search history.

(56) References Cited

U.S. PATENT DOCUMENTS

| | | |
|---|---|---|
| 6,707,959 B2 | 3/2004 | Ducellier et al. |
| 8,045,854 B2 | 10/2011 | Colbourne |
| 8,233,794 B2 | 7/2012 | Colbourne et al. |
| 2013/0064554 A1 | 3/2013 | Li et al. |

(Continued)

OTHER PUBLICATIONS

Fontaine et al., "Few-Mode Fiber Wavelength Selective Switch with Spatial-Diversity and Reduced-Steering Angle," Optical Society of America, 2014, 3 pages.

(Continued)

*Primary Examiner* — Juan A Torres
(74) *Attorney, Agent, or Firm* — Harrity & Harrity, LLP (57) ABSTRACT

A wavelength selective switch (WSS) may include a front-end unit that includes an input few-mode fiber (FMF) providing an input optical signal including multiple wavelengths. The multiple wavelengths may each have N modes. The front-end unit may include two or more output few-mode fibers (FMFs), and a side that has a 1×N port for each of the input FMF and the two or more output FMFs. Each of the 1×N ports may be single mode in a wavelength dispersion dimension and N-mode in a switching dimension. The WSS may include a switching element to receive the input optical signal from the front-end unit, switch each of the multiple wavelengths of the input optical signal to form one or more output optical signals, and direct each of the one or more output optical signals to a corresponding 1×N port of the front-end unit.

20 Claims, 6 Drawing Sheets

(56) References Cited

U.S. PATENT DOCUMENTS

2014/0313469 A1* 10/2014 Ip .............................. G02F 1/31
349/196
2015/0085884 A1* 3/2015 Fontaine ................. H04J 14/06
370/542

OTHER PUBLICATIONS

Labroille et al., "Efficient and mode selective spatial mode multiplexer based on multi-plane light conversion," Optics Express, Optical Society of America, vol. 22, No. 13, Jun. 30, 2014, 9 pages.
Sridharan et al., "Mode-converters for rectangular-core fiber amplifiers to achieve diffraction-limited power scaling," Optics Express, Optical Society of America, vol. 20, No. 27, Dec. 17, 2012, 9 pages.

* cited by examiner

USE OF WAVELENGTH SELECTIVE SWITCH FOR A FEW-MODE FIBER

RELATED APPLICATION

This application claims priority under 35 U.S.C. § 119 to U.S. Provisional Patent Application No. 62/219,431, filed on Sep. 16, 2015, the content of which is incorporated by reference herein in its entirety.

TECHNICAL FIELD

The present disclosure relates to a wavelength selective switch (WSS) and, more particularly, to a WSS for use with a few-mode fiber (FMF), where a mode structure, associated with modes of the FMF, are single-mode in a first dimension and multi-mode in a second dimension.

BACKGROUND

In an optical communication network, optical signals, having optical channels centered around individual wavelengths (sometimes referred to as "wavelength channels"), may be transmitted from one location to another through a length of an optical fiber, such as a single-mode fiber (SMF). An optical cross-connect module may allow for switching of optical signals from one optical fiber to another optical fiber. Similarly, a wavelength-selective optical cross-connect (herein referred to as a "wavelength selective switch" (WSS)) may provide for reconfigurable wavelength-dependent switching between optical fibers. In other words, the WSS may allow one or more first wavelength channels to be switched from a first optical fiber to a second optical fiber, while permitting one or more second (i.e., different) wavelength channels to propagate in the second optical fiber or to be switched to a third optical fiber. In a typical scenario, the WSS may be configured to switch wavelength channels between one or more input optical fibers and a group (e.g., four, eight, ten, twenty, etc.) output optical fibers.

SUMMARY

According to some possible implementations, a wavelength selective switch (WSS) may include: a front-end unit comprising: an input few-mode fiber (FMF) providing an input optical signal comprising multiple wavelengths, where the multiple wavelengths each have N modes; two or more output few-mode fibers (FMFs); and a side of the front-end unit that has a 1×N port for each of the input FMF and the two or more output FMFs, where each of the 1×N ports may be single mode in a wavelength dispersion dimension and N-mode in a switching dimension, where the switching dimension may be perpendicular to the wavelength dispersion dimension, and the switching dimension and the wavelength dispersion dimension may be perpendicular to a direction of propagation of the input optical signal; and a switching element to: receive the input optical signal from the front-end unit; switch each of the multiple wavelengths of the input optical signal to form one or more output optical signals; and direct each of the one or more output optical signals to a corresponding 1×N port of the front-end unit.

According to some possible implementations, a wavelength selective switch (WSS) may include: a front-end unit comprising: two or more input few-mode fibers (FMFs) providing two or more input optical signals, where each input optical signal may comprise multiple wavelengths, where the multiple wavelengths each has N modes; at least one output few-mode fiber (FMF); and a side of the front-end unit having a 1×N port for each of the two or more input FMFs and the at least one output FMF, where each of the 1×N ports may be single mode in a wavelength dispersion dimension and N-mode in a switching dimension; and a switching element to: receive the two or more input optical signals from the front-end unit; switch each of the multiple wavelengths of the two or more input optical signals to form one or more output optical signals; and direct each of the one or more output optical signals to a corresponding 1×N port of the front-end unit.

According to some possible implementations, a wavelength selective switch (WSS) may include: a front-end unit comprising: an input fiber providing an input optical signal comprising multiple wavelengths, where the multiple wavelengths each has N modes; at least two output fibers; and the front-end unit having a 1×N port for each of the input fiber and the at least two output fibers, where each of the 1×N ports may be single mode in a wavelength dispersion dimension and N-mode in a switching dimension; and a switching element to: receive the input optical signal from the front-end unit; switch each of the multiple wavelengths of the input optical signal to form one or more output optical signals; and direct each of the one or more output optical signals to a corresponding 1×N port.

DETAILED DESCRIPTION

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

In some cases, it may be desirable to use a few-mode fiber (FMF) with a WSS. A FMF is an optical fiber that supports N modes (50≥N>1, N∈Integer), where the number of N modes is more than the one spatial mode (e.g., a pathway for an optical signal within an optical fiber) supported by a SMF, but fewer spatial modes than a typical number of spatial modes supported by a larger-core multi-mode fiber. For example, in some implementations, the FMF may support approximately two to 50 spatial modes, while three, six, and ten modes are typical for circular core FMF. Alternatively, 20 or less modes may be typical for rectangular core FMF. In some cases, it may be desirable to use FMFs for transmission of information since information can be encoded on each of the modes, thus increasing the fiber transmission capacity as compared to a SMF.

However, when using a FMF with a WSS, wavelength degradation may become problematic. For example, using the FMF with the WSS may result in degradation of spectral resolution since different modes propagating in the FMF have different physical positions within the FMF core, and a change in physical position in the wavelength dispersion direction of the WSS will result in a wavelength shift of the spectral response, and hence a change in the passband edge locations. The different possible passband edge locations (i.e., a range of possible passband edge locations) cause a reduction in a clear channel passband, associated with each channel, within which information may be transmitted. In other words, use of FMF with the WSS may reduce an amount of usable bandwidth of the WSS as compared to an amount of usable bandwidth when using a SMF, thereby negating, at least partially, the increased fiber transmission capacity gained by use of FMF.

However, even in a case where such degradation may be reduced, use of the FMF with the WSS may lead to an increased switching angle requirement for a switching element of the WSS (e.g., when maintaining a typical WSS port spacing). For example, for a typical WSS that includes a set of SMFs (e.g., an input SMF and a pair of output SMFs) in a linear arrangement, the switching element of the WSS should be capable of switching between any pair of SMFs. A solution aimed to reduce degradation of spectral resolution when using FMF may include a WSS designed to operate based on sampling modes of N-mode FMFs and coupling each mode of each fiber to a separate SMF to create a linear structure of individual SMFs.

Figure 1:
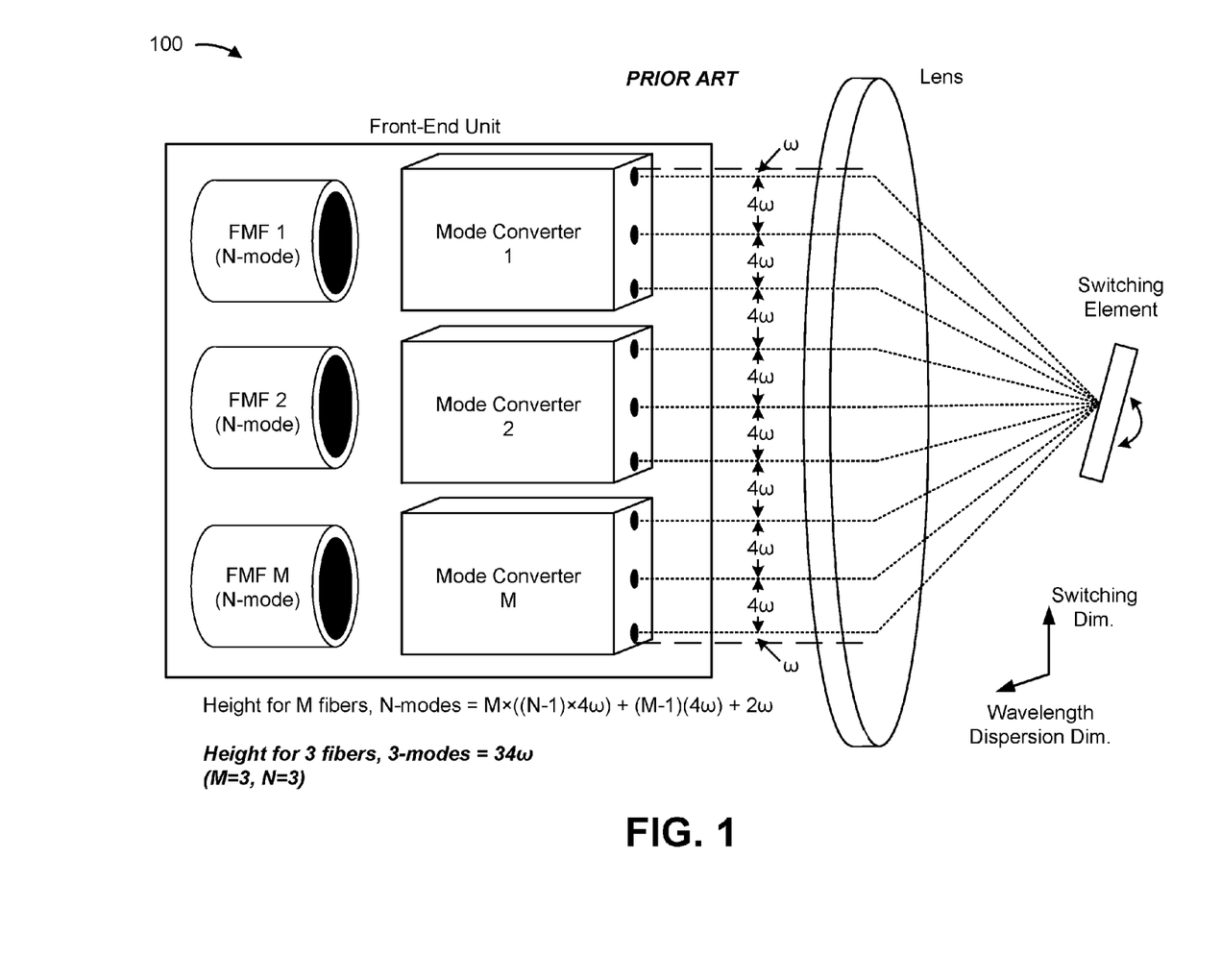
FIG. 1 is a diagram of a prior wavelength selective switch designed to reduce degradation of spectral resolution when using few-mode fiber.

FIG. 1 is a diagram of a prior WSS designed to reduce degradation of spectral resolution when using FMF. As shown in FIG. 1, the prior WSS may include a front-end unit that includes an array of N-mode FMFs (FMF 1 through FMF M) and a set of mode converters (mode converter 1 through mode converter M), each associated with a FMF. As further shown, the prior WSS may include a focusing lens and a switching element. In practice, the prior WSS may include one or more additional optical components associated with performing wavelength selective switching that, for purposes of clarity, are not shown in FIG. 1. Any FMF may be used as an input and/or an output.

As shown in FIG. 1, the FMFs may be round FMFs, where each FMF is capable of supporting N modes. The N modes supported by a FMF are, collectively, multi-mode in both a first dimension (e.g., a wavelength dispersion dimension) and a second dimension (e.g., a switching dimension).

For the prior WSS, a mode converter may be configured to convert a mode structure of an optical signal to and/or from the multi-mode structure associated with a FMF 210, from and/or to a set of single-mode waveguides. Such a device is sometimes referred to as a "photonic lantern." For example, as shown in FIG. 1, assume that FMF 1 is an input FMF that supports N modes (e.g., three modes are used as an example in FIG. 1). The mode converter 1 has at the right facet in FIG. 1 a set of N single-mode waveguides. At a first facet of mode converter 1 (e.g., a facet coupled to FMF 1 at a left side of mode converter 1 in FIG. 1) the N waveguides formed within mode converter 1 may be brought close together or even touching or overlapping, such that the N waveguides of mode converter 1 sample the N modes of the optical signal provided to mode converter 1 via FMF 1. The N single-mode waveguides then each carry a portion of the N modes of the optical signal from FMF 1, however the content of each waveguide may be a linear combination of some or all of the N modes propagating in FMF 1. For example, the first waveguide may contain only signal from the first mode of FMF 1, or it may contain only signal from the second mode of FMF 1, or only signal from the third mode of FMF 1, or it may contain a combination of signals from any two or all three modes that were propagating in FMF 1. However, since each waveguide contains a different combination of the modes from FMF 1, it is possible by examining the signals present in all N waveguides to reconstruct the original signals propagating in FMF 1. In this description we will refer to the signal coupled to the first waveguide as the "first broken-out mode," the signal coupled to the second waveguide as the "second broken-out mode," and so on, understanding that the broken-out modes may not correspond to distinct modes present in FMF 1. The number of broken-out modes usually corresponds to the number of modes present in FMF 1, however there could be situations where the number of broken-out modes is less than or greater than the number of modes in FMF 1.

Within mode converter 1 (e.g., moving from left to right in FIG. 1), the set of N waveguides may be formed such that ports at a second facet of mode converter 1 (shown as a right side of mode converter 1 in FIG. 1) are arranged in a linear arrangement (e.g., a 1×3 arrangement is shown in FIG. 1). As shown, other mode converters of the prior WSS may be similarly configured such that M sets of N single-mode optical signals, each corresponding to a different mode converter, are positioned in linear arrangement that is single mode in the wavelength dispersion dimension and multi-mode in the switching dimension. Here, since the linear arrangement of the M sets of N single-mode optical signals shown in FIG. 1 is single mode in the wavelength dispersion dimension, degradation of spectral resolution in the prior WSS is decreased (e.g., as compared to a prior WSS that directly uses a FMF that is multi-mode in two dimensions, without mode converter).

As further shown in FIG. 1, in order to avoid crosstalk between wavelength channels associated with each waveguide, the prior WSS maintains a port spacing (e.g., a distance between adjacent ports) of typically 4ω, where ω is a beam radius of a single-mode input. However, the 4ω port spacing may result in an optics height that is undesirably large, which may negatively impact complexity and/or cost associated with the prior WSS 100. For example, as shown in FIG. 1, an optics height of the prior WSS with a quantity of M N-mode FMFs may be determined as follows:

$$\text{Optics Height} = M \times ((N-1) \times 4\omega) + (M-1)(4\omega) + 2\omega$$

As shown in FIG. 1, for a prior WSS including three, three-mode FMFs (M=3, N=3), and maintaining the port spacing of 4ω, the optics height of the prior WSS is approximately equal to 34ω (e.g., 3×((3−1)×4ω)+(3−1) (4ω)+2ω=34ω). The optics height of a FMF WSS may be reduced, without affecting performance, using techniques described below, which may reduce complexity and/or cost of the FMF WSS.

Moreover, with regard to the prior WSS, the switching element must be capable of switching between (M−1) N ports (e.g., from a port associated with a first broken-out mode of the first FMF to a port associated with the first broken-out mode of the third FMF) in order to achieve switching between any mode of any pair of FMFs. Switching across a higher number of ports (e.g., across (M−1)N ports for the prior WSS as compared to (M−1) ports for a SMF WSS) necessitates an increased switching angle of the switching element (e.g., as compared to a SMF WSS), which results in increased cost and/or increased complexity of the switching element.

A potential solution to avoid both the wavelength resolution degradation issue and the increased switching angle issue is to sample and reformat the modes of the FMFs into a linear structure that groups single-mode waveguides corresponding to a particular broken-out mode (sometimes referred to as "remapping"). For example, according to the remapping technique, the WSS is designed to operate based on sampling the modes of each FMF into a linear arrangement of individual single-mode waveguides, where a first set of three adjacent single-mode waveguides corresponds to the first broken-out modes from each FMF, a second set of three adjacent FMFs corresponds to the second broken-out modes from each FMF, a third set of three adjacent FMFs corresponds to the third broken-out modes from each FMF, and so on. In other words, the modes are remapped to be grouped based on broken-out mode, rather than being grouped by FMF (as with the prior WSS of FIG. 1).

Use of the remapping technique may reduce the wavelength degradation and, since ports corresponding to a same broken-out mode are grouped, will reduce the switching angle requirement for the switching element of the WSS where a particular broken-out mode from one fiber couples to the same broken-out mode of another fiber. However, use of the remapping technique may call for an undesirable port spacing requirement between ports of the WSS. For example, since broken-out modes are interleaved as a result of applying the remapping technique (e.g., such that adjacent single-mode ports do not correspond to a same FMF), the typical port spacing of 4ω may need to be maintained in order to avoid crosstalk from an intended fiber to an unintended fiber. As described above, such a port spacing is directly related to an optics height of WSS, which may impact complexity, cost, and/or manufacturability of the WSS.

Implementations described herein provide a WSS, for use with FMF, that provides decreased degradation of spectral resolution in the WSS (e.g., as compared to a prior WSS that directly uses a FMF that is multi-mode in two dimensions) while allowing for a reduced switching angle requirement and/or a reduced optics height (e.g., as compared to a prior WSS that uses SMFs or single-mode waveguides to carry individual broken-out fiber modes).

Figure 2A:
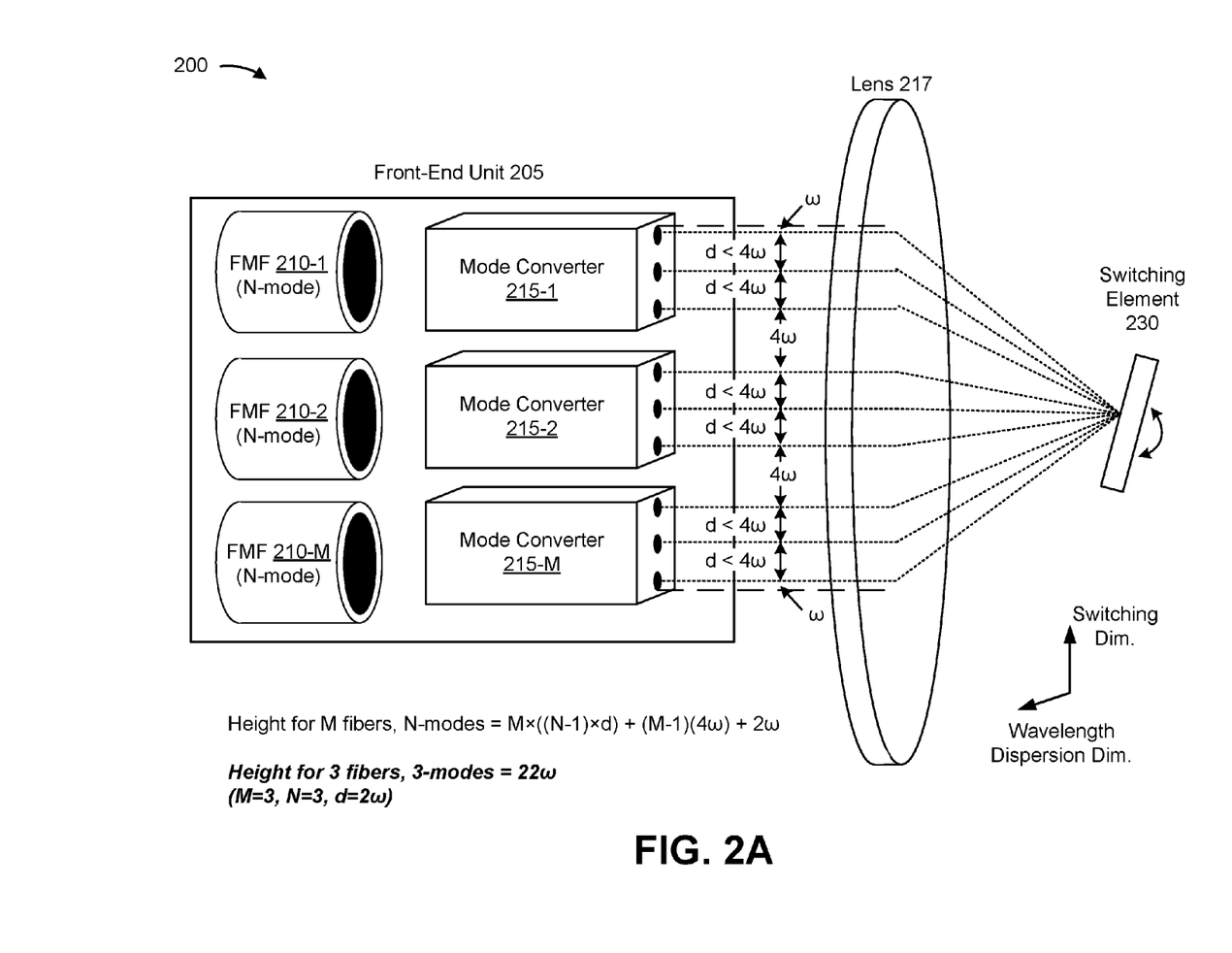
FIGS. 2A-2C are diagrams of example wavelength selective switches, for use with few-mode fiber, that provide decreased degradation of spectral resolution while allowing for a reduced switching angle requirement and/or a reduced optics height.

FIG. 2A is a diagram of an example WSS 200 for use with FMF (herein referred to as WSS 200) that provides decreased degradation of spectral resolution while allowing for a reduced switching angle requirement and/or a reduced optics height, as described herein.

As shown in FIG. 2A, WSS 200 may include a front-end unit 205 that includes an array of N-mode FMFs 210 (FMF 210-1 through FMF 210-M) and a set of mode converters 215 (mode converter 215-1 through mode converter 215-M), each associated with a FMF 210. As further shown, WSS 200 may include a focusing lens and switching element 230. In practice, WSS 200 includes one or more additional optical components associated with performing wavelength selective switching (such as wavelength dispersion means) that, for purposes of clarity, are not shown in FIG. 2A. Additional description regarding elements, components, and an environment of WSS 200 are described below with regard to FIGS. 3 and 4.

As shown in FIG. 2A, in some implementations, FMFs 210 may be round FMFs, where each FMF 210 is capable of supporting N modes. The N modes supported by FMF 210 are, collectively, multi-mode in both a first dimension (e.g., a wavelength dispersion dimension) and a second dimension (e.g., a switching dimension).

In some implementations, mode converter 215 may be configured to convert a mode structure of an optical signal to and/or from the multi-mode structure associated with FMF 210. For example, as shown in FIG. 2A, assume that FMF 210-1 is an input FMF that supports N modes (e.g., three modes are used as an example in FIG. 2A). Here, a first facet of mode converter 215-1 (e.g., a facet coupled to FMF 210-1 at a left side of mode converter 215-1 in FIG. 2A) may include N ports corresponding to a set of N waveguides formed within mode converter 215-1. The N ports may be arranged in a pattern (e.g., a triangular pattern, a circular pattern, a rectangular pattern, a square pattern, an overlapping pattern, etc.) such that the N waveguides of mode converter 215-1 sample the N modes of the optical signal provided to mode converter 215-1 via FMF 210-1. Here, the N waveguides act as a set of N individual SMFs.

Within mode converter 215-1 (e.g., moving from left to right in FIG. 2A), the set of N waveguides may be formed such that ports at a second facet of mode converter 215-1 (shown as a right side of mode converter 215-1 in FIG. 2A) are arranged in a 1×N linear arrangement (e.g., a 1×3 linear arrangement is shown in FIG. 2A). As shown, the 1×N linear arrangement of the N optical signals at the second facet of mode converter 215-1 is single mode in the wavelength dispersion dimension and multi-mode in the switching dimension. As shown, other mode converters 215 of WSS 200 may be similarly configured such that M sets of N single-mode optical signals, each corresponding to a different mode converter 215, are positioned in a linear arrangement that is single mode in the wavelength dispersion dimension and multi-mode in the switching dimension. Here, since the linear arrangement of the M sets of N single-mode optical signals shown in FIG. 2A is single mode in the wavelength dispersion dimension, degradation of spectral resolution in WSS 200 is decreased (e.g., as compared to the prior WSS that directly uses a FMF that is multi-mode in two dimensions).

As further shown in FIG. 2A, in some implementations, a port spacing at the second facet of mode converter 215 may be reduced (as compared to the prior WSS described in connection with FIG. 1). For example, as described above for the prior WSS of FIG. 1, a minimum port spacing (e.g., 4ω) may be maintained in order to prevent crosstalk between ports associated with different broken-out modes of a given FMF. However, with regard to WSS 200, the N optical signals, associated with a given mode converter 215, support wavelength channels having the N modes of a single FMF 210. Since crosstalk among the N modes of a particular wavelength channel may already be occurring in a FMF core external to WSS 200, crosstalk within WSS 200 between the broken-out modes of the particular wavelength channel for a same FMF 210 may not have an adverse consequence on the performance of the WSS 200. Thus, as shown in FIG. 2A, the spacing (labeled "d" in FIG. 2A) may be reduced (i.e., to be less than 4ω) between ports at the second facet of mode converter 215. For example, the port spacing may be approximately 2ω or less. Notably, as shown, the 4ω port spacing may be maintained between ports associated with different FMFs 210 in order to prevent crosstalk.

Here, the reduced port spacing in the switching dimension allows for a reduced switching angle requirement for switching element 230 and/or a reduced optics height of WSS 200 (e.g., as compared to the prior WSS described in connection with FIG. 1). For example, as shown in FIG. 2A, an optics height of WSS 200 with a quantity of M N-mode FMFs 210 may be determined as follows:

Optics Height=$M \times ((N-1) \times d) + (M-1)(4\omega) + 2\omega$

As shown in FIG. 2A, for WSS 200 including three, three-mode FMFs 210, and using a port spacing of 2ω (M=3, N=3, d=2ω), the optics height of WSS 200 is approximately equal to 22ω (e.g., $3 \times ((3-1) \times 2\omega) + (3-1)(4\omega) + 2\omega = 22\omega$). Here, the optics height of WSS 200 (20ω) is less than the optics height of the prior WSS of FIG. 1 (34ω), which allows WSS 200 to be smaller in size and/or less costly to manufacture than the prior WSS of FIG. 1. Furthermore, due to the reduced optics height, a switching angle requirement of WSS 200 may be less than a switching angle requirement of the prior WSS of FIG. 1, which allows for a less complex and/or less costly switching element 230 to be utilized in WSS 200.

Figure 2B:
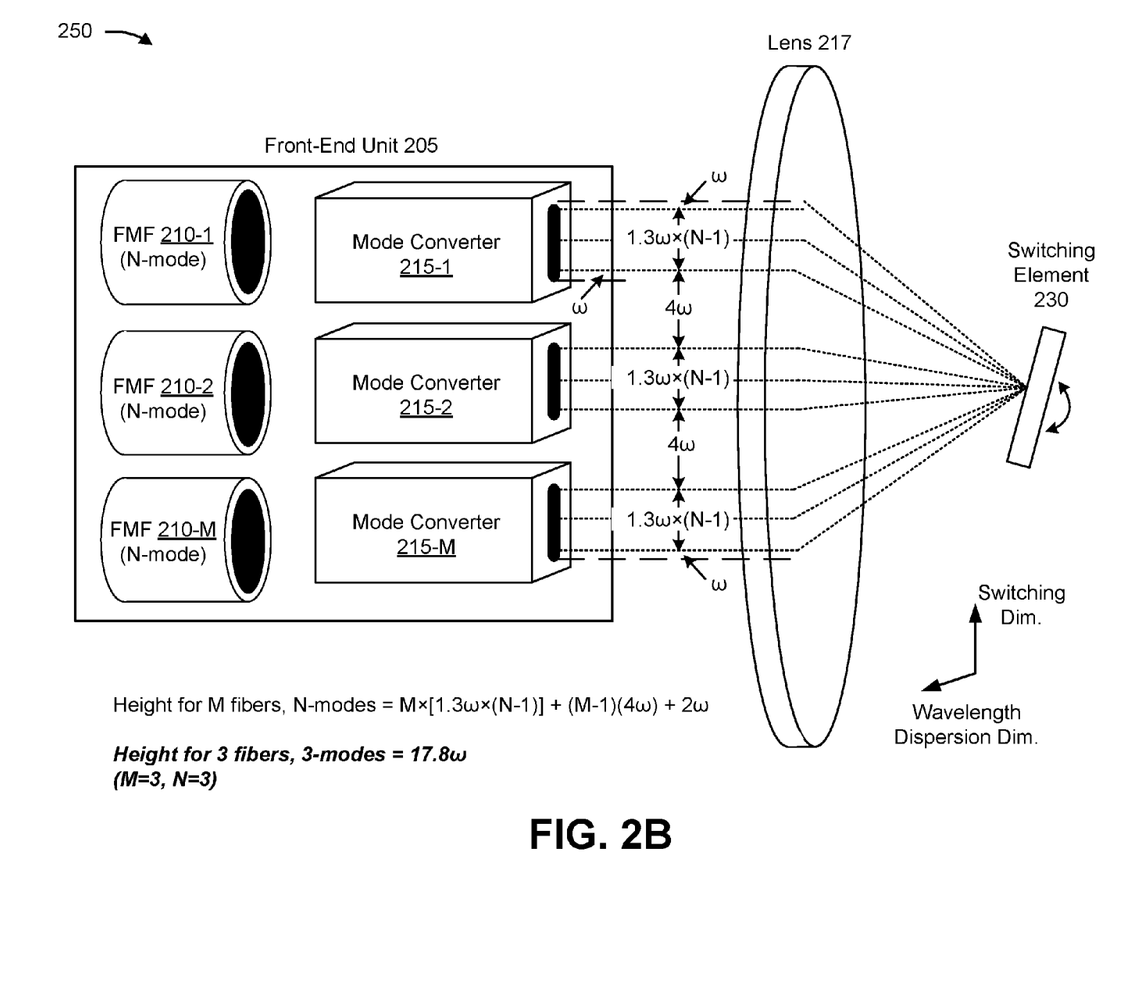

FIG. 2B is a diagram of an additional example WSS 250 for use with FMF (herein referred to as WSS 250) that provides decreased degradation of spectral resolution while allowing for a reduced switching angle requirement and/or a reduced optics height, as described herein.

As shown in FIG. 2B, WSS 250 may include a front-end unit 205 including an array of FMFs 210 (FMF 210-1 through FMF 210-M) and a set of mode converters 215 (mode converter 215-1 through mode converter 215-M), each associated with a FMF 210. As further shown, WSS 250 may include a focusing lens and switching element 230. In practice, WSS 250 includes one or more additional optical components associated with performing wavelength selective switching (such as wavelength dispersion means) that, for purposes of clarity, are not shown in FIG. 2B. Additional description regarding elements, components, and an environment of WSS 250 are described below with regard to FIGS. 3 and 4.

As shown in FIG. 2B, in some implementations, FMFs 210 may be round FMFs, where each FMF 210 is capable of supporting N modes. The N modes supported by FMF 210 are, collectively, multi-mode in both a first dimension (e.g., a wavelength dispersion dimension) and a second dimension (e.g., a switching dimension).

As described above, in some implementations, mode converter 215 may be configured to convert a mode structure of an optical signal to and/or from the multi-mode structure associated with FMF 210. For example, as shown in FIG. 2B, assume that FMF 210-1 is an input FMF that supports N modes. Here, the first facet of mode converter 215-1 (e.g., a facet coupled to FMF 210-1 at a left side of mode converter 215-1 in FIG. 2B) may include N ports corresponding to a set of N waveguides formed within mode converter 215-1. Here, the N ports may be arranged in a pattern such that the N waveguides of mode converter 215-1 sample the N modes of the optical signal provided to mode converter 215-1 via FMF 210-1.

Within mode converter 215-1 (e.g., moving from left to right in FIG. 2B), the set of N waveguides may be formed such the N waveguides merge to form a single (e.g., rectangular) waveguide with a single port at a second facet of mode converter 215-1 (shown as a right side of mode converter 215-1 in FIG. 2B). The single waveguide formed from the multiple waveguide provides a 1×N port at the right facet of mode convertor 215-1. Here, the single waveguide, and the associated port, support an N-mode optical signal that is single mode in the wavelength dispersion dimension and multi-mode in the switching dimension. In some implementations, a height of the port in the switching dimension may be equal to approximately 1.3ω×(N−1)+2ω in order to support the N modes, while a width of the port in the wavelength dispersion dimension may be approximately 2ω to support a single mode (i.e., the width of the port may be approximately equal to a diameter of the single mode). Put another way, the waveguides may merge to form a single waveguide that supports N optical signals within a 1×N mode structure. Put still another way, space between the waveguides may be reduced until there is no space between the waveguides, thereby forming a single waveguide and an associated single port, where the single waveguide and the single port are capable of supporting the N optical signals with the 1×N mode structure. As described above, crosstalk between the N optical signals associated with N modes of a particular FMF 210 may not adversely affect performance of WSS 250, which allows any spacing maintained between the N optical signals, associated with a given FMF 210, to be eliminated.

As shown, other mode converters 215 of WSS 250 may be similarly configured such that a set of M N-mode optical signals, each corresponding to a different mode converter 215, are positioned in linear arrangement that is single mode in the wavelength dispersion dimension and multi-mode in the switching dimension. Here, since the linear arrangement of the set of M N-mode optical signals shown in FIG. 2B is single mode in the wavelength dispersion dimension, degradation of spectral resolution in WSS 250 is decreased (e.g., as compared to the prior WSS that directly uses a FMF that is multi-mode in two dimensions, without mode converters).

As further shown in FIG. 2B, in some implementations, an optics height of WSS 250 may be reduced (as compared to the prior WSS described in connection with FIG. 1). For example, as shown in FIG. 2B, since mode converter 215 includes a single port with a height of 1.3ω×(N−1)+2ω, the optics height of WSS 250 may be reduced. In such a case, the additional waveguide size per additional mode, associated with a given FMF 210 of WSS 250, may be approximately 1.3ω (where ω is the beam radius of a single-mode input with the same numerical aperture, or far-field divergence angle, as the multi-mode input). Notably, as shown, the 4ω port spacing may be maintained between ports associated with different FMFs 210 in order to prevent crosstalk.

Similar to WSS 200, the reduced port spacing in the switching dimension allows for a reduced switching angle requirement for switching element 230 and/or a reduced optics height of WSS 250 (e.g., as compared to the prior WSS described in connection with FIG. 1). For example, as shown in FIG. 2B, an optics height of WSS 250 with a quantity of M N-mode FMFs 210 may be determined as follows:

Optics Height=$M \times [1.3\omega \times (N-1)] + (M-1)(4\omega) + 2\omega$

As shown in FIG. 2B, for WSS 250 including three, three-mode FMFs 210 (M=3, N=3), the optics height of WSS 250 is approximately equal to 17.8ω (e.g., $3 \times [1.3\omega \times (3-1)] + (3-1)(4\omega) + 2\omega = 17.8\omega$). Here, the optics height of WSS 250 (17.8ω) is less than the optics height of the prior WSS of FIG. 1 (34ω), which allows WSS 250 to be smaller in size and/or less costly to manufacture than the prior WSS of FIG. 1. Furthermore, due to the reduced optics height, a switching angle requirement of WSS 250 may be less than a switching angle requirement of the prior WSS of FIG. 1, which allows for a less complex and/or less costly switching element 230 to be utilized in WSS 250. Further, an optics height of a given 1×N mode structure of WSS 250 (e.g., associated with a given mode converter 215) is approximately equal to 1.3ω×(N−1)+2ω.

The number and arrangement of components shown in FIGS. 2A and 2B are provided as examples. In practice, WSS 200 and/or WSS 250 may include additional components, fewer components, different components, differently formed components, differently designed components, or differently arranged components than those shown in FIGS. 2A and 2B. Additionally, or alternatively, a set of components (e.g., one or more components) of WSS 200 and/or WSS 250 may perform one or more functions described as being performed by another set of components of WSS 200 and/or WSS 250.

For example, while mode converter 215, associated with WSS 250, is described as including, at a first facet of mode converter 215 (e.g., a facet coupled to FMF 210), a set of N ports and an associated set of N waveguides, in some implementations, mode conversion may be achieved using a different technique. For example, mode converter 215 may, at the first facet, include a single port, and a single associated waveguide, that supports N modes (e.g., a square, circular, or rectangular waveguide that supports multiple modes in the switching dimension and multiple modes in the wavelength dispersion dimension). In this example, one or more sides of the waveguide may, along a length of mode converter 215 (e.g., moving from left to right in FIG. 2B) rotate, distort, angle, shift, or otherwise be altered to form the waveguide that supports the N-mode optical signal that is single mode in the wavelength dispersion dimension and multi-mode in the switching dimension. In some implementations, such an arrangement that does not separate the N modes may provide for a reduced amount of insertion loss.

As another example, mode converter 215 may include a series of diffractive elements that convert an N-mode optical signal that is multi-mode in the wavelength dispersion dimension and the switching dimension to and/or from an N-mode optical signal that is single mode in the wavelength dispersion dimension and multi-mode in the switching dimension.

As still another example, while the optical signals shown in FIGS. 2A and 2B are in a linear arrangement with 4ω separation between sets of optical signals associated with different FMFs 210, in the switching dimension, in some implementations, the sets of optical signals may be arranged in another manner. As a particular example, in some implementations, WSS 200 and/or WSS 250 may be designed such that sets of optical signals are separated by 4ω in the wavelength dispersion dimension. In other words, the arrangement may be a stacked arrangement rather than the linear arrangement shown in FIGS. 2A and 2B, in which case the switching element steers sub-beams in the wavelength dispersion dimension.

Figure 2C:
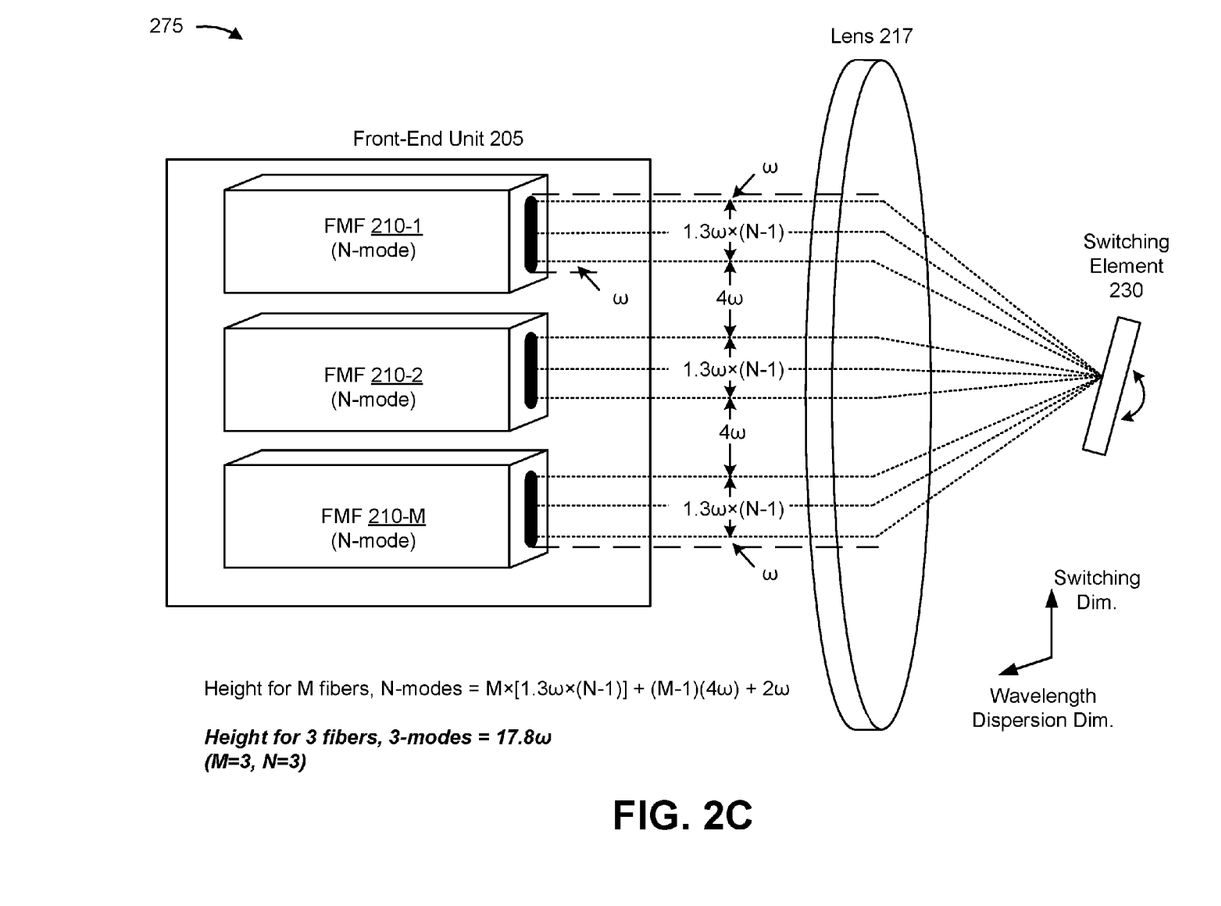

In some implementations, mode converter 215 is optional. FIG. 2C is a diagram of an another example WSS 275 for use with FMF (herein referred to as WSS 275) that provides decreased degradation of spectral resolution while allowing for a reduced switching angle requirement and/or a reduced optics height, as described herein, without mode conversion.

As shown in FIG. 2C, WSS 275 may include FMFs 210 that receive and/or provide N-mode optical signals that are single mode in the wavelength dispersion dimension and N-mode in the switching dimension. Such FMFs may be utilized when, for example, mode conversion is performed at a point on an optical path that is external to WSS 275, when a transmission fiber is single mode in the wavelength dispersion dimension and N-mode in the switching dimension, or the like. In this case, FMFs 210 of WSS 275 may be capable of receiving and/or providing optical signals that are single mode in the wavelength dispersion dimension and N-mode in the switching dimension (i.e., FMFs 210 may be rectangular few mode fiber, rather than circular few mode fiber). As shown in FIG. 2C, mode conversion is not necessary within WSS 275 and, therefore, WSS 275 does not include mode converters 215. However, as shown, the optics height of WSS 275 may be similar to that of WSS 250.

The number and arrangement of components shown in FIG. 2C are provided as examples. In practice, WSS 275 may include additional components, fewer components, different components, differently formed components, differently designed components, or differently arranged components than those shown in FIG. 2C. Additionally, or alternatively, a set of components (e.g., one or more components) of WSS 275 may perform one or more functions described as being performed by another set of components of WSS 275.

Figure 3:
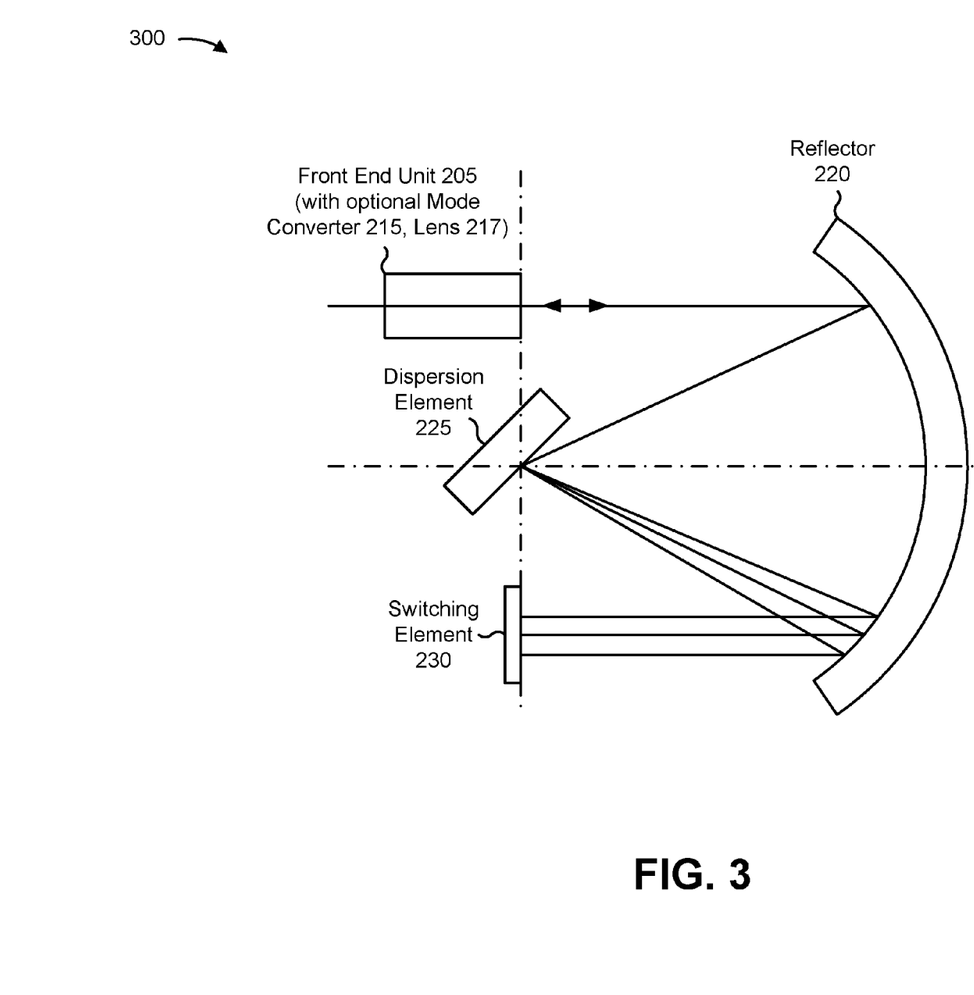
FIG. 3 is a diagram of example components of a wavelength selective switch, for use the few-mode fiber, as described with regard to FIGS. 2A-2C.

FIG. 3 is a diagram of example components of WSS 300. WSS 300 may correspond to WSS 200, WSS 250, and/or WSS 275. In some implementations, WSS 300 may include front-end unit 205 with an array of FMFs 210, and (optionally) one or more mode converters 215, and lens 217. As further shown, WSS 300 also includes a reflector 220, a dispersion element 225, and a switching element 230. The tallest component in WSS 300 is typically the reflector 220; whereas we have been previously referring to "optics height" as the height of the ports and/or modes within front end unit 205, the height of reflector 220 is equal to or greater than that "optics height" times the ratio of focal length of reflector 220 to the focal length of lens 217. So the overall height of WSS 300 is directly related to the "optics height" previously calculated, and any increase or decrease in "optics height" corresponds to a proportional increase or decrease in height of WSS 300.

As described elsewhere herein, WSS 300 may include a wavelength selective switch capable of providing reconfigurable wavelength-dependent switching. In some implementations, WSS 300 may be capable of switching a first wavelength channel (e.g. all modes of the first wavelength channel) to a first optical fiber while simultaneously switching a second wavelength channel (e.g. all modes of the second wavelength channel) to a second optical fiber. In some implementations, WSS 300 may include a set of ports associated with sending and/or receiving an optical signal. In some implementations, WSS 300 may be connected to a FMF 210 (e.g., as an input, as an output). In some implementations, WSS 300 may be connected to one or more other WSSs 300 and/or one or more other devices (e.g., receiver modules, transmitter modules) via FMFs 210.

Front-end unit 205 may include one or more components associated with receiving and/or providing an optical signal via FMF 210 (e.g., a multi-wavelength signal with wavelength channels having N modes). For example, front-end unit 205 may include a connection with a set of FMFs 210, a set of micro-lenses, a lens, or the like. Here, each FMF 210 may transmit an optical signal (e.g., a beam of light containing, for example, communication signals) into a respective micro-lens. After passing through the respective micro-lens, the optical signal may be deflected by the lens and directed to reflector 220.

In some implementations, front-end unit 205 may optionally include a mode converter 215. Mode converter 215 may include a component configured to convert a structure of modes of an optical signal to and/or from a structure that is single-mode in a first dimension and multi-mode in a second dimension (i.e., a one-dimensional structure), as described herein. For example, front-end unit 205 may include mode converter 215 when FMF 210 is a two-dimensional FMF 210 (e.g., multi-mode in the first dimension and multi-mode in the second dimension, circular, oval-shaped, etc.), such that mode converter 215 may convert the mode structure of the two-dimensional FMF 210 to a structure that is single-mode in a first dimension and multi-mode in a second dimension.

Reflector 220 may include a component positioned to reflect a beam of light provided by another component of WSS 300. For example, reflector 220 may include a spherical reflector positioned to reflect beams of light from and/or to front-end unit 205, dispersion element 225, and/or switching element 230.

Dispersion element 225 may include a component positioned to separate a beam of light into a group of sub-beams (e.g., having different wavelengths) for transmission (e.g., via reflector 220) to switching element 230 and/or recombine sub-beams of light for transmission (e.g., via reflector 220) to front-end unit 205 (e.g., to a predetermined input port and/or output port). For example, dispersion element 225 may include a prism, a diffraction grating, or the like.

Switching element 230 (sometimes referred to as a modifying element) may include a component capable of modifying a beam of light (e.g., a sub-beam provided by dispersion element 225) such that the beam of light may be switched between optical fibers associated with WSS 300. For example, switching element 230 may include a micro-electro-mechanical systems (MEMS) array that includes a set of movable mirrors, a liquid crystal on silicon (LCoS) phase modulator array, a liquid crystal polarization rotating element and birefringent beam steering element, or the like. In some implementations, a steering angle requirement associated with switching element 230 may be reduced using the techniques described herein.

The number and arrangement of components shown in FIG. 3 are provided as example. In practice, WSS 300 may include additional components, fewer components, different components, or differently arranged components than those shown in FIG. 3. Additionally, or alternatively, a set of components (e.g., one or more components) of WSS 300 may perform one or more functions described as being performed by another set of components of WSS 300.

Figure 4:
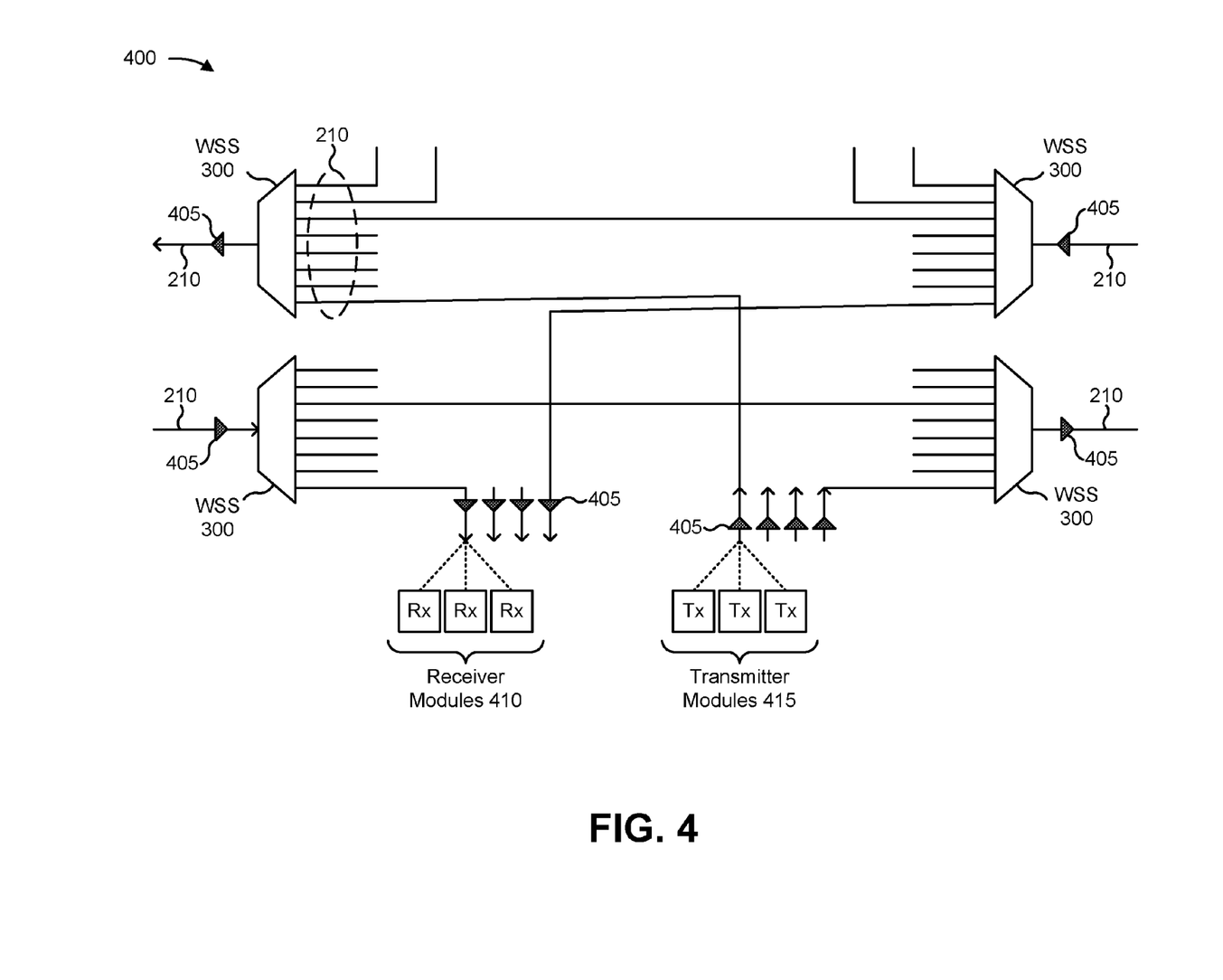
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a group of FMFs 210 connected to a corresponding group of WSSs 300, optical amplifiers 405, receiver (Rx) modules 410, and transmitter (Tx) modules 425.

As described elsewhere herein, FMF 210 may include an optical fiber that supports more than one spatial mode supported by a SMF, but fewer spatial modes than the multiple spatial modes supported by a MMF. In some implementations, FMF 210 may be used as an input or an output of WSS 300. In FIG. 4, all input and output FMFs 210 for a WSS 300 may be included in Front End Unit 205 of FIG. 3.

Optical amplifier 405 may include a component configured to amplify an optical signal as the optical signal is transmitted over a FMF 210, an optical fiber that connects WSS 300 and Rx module 410, and/or an optical fiber that connects Tx module 415 and WSS 300.

Rx module 410 may include one or more components associated with receiving and/or processing an optical signal, such as optical receivers, waveguides, demultiplexers, splitters, switches, or the like. Shown is an implementation where three modes of FMF 210 are separated into three broken-out modes, each of which may travel via an individual single-mode fiber, and may be a linear combination of an original input signal in the three fiber modes. Here, following detection of a given signal associated with a single-mode fiber, MIMO processing may extract signals corresponding to each of the three modes, and provide the extracted signals, to a separate optical receiver. Each optical receiver of Rx module 410 may operate to convert an input optical signal to an electrical signal that represents transmitted data. In some implementations, the optical receivers of Rx module 410 may each include one or more photodetectors and/or related components to receive respective input optical signals output by an optical demultiplexer of Rx module 410, convert the optical signals to a photocurrent, and provide a voltage output to function as an electrical signal representation of the original optical signal. With transmission using FMF, multi-input multi-output (MIMO) processing techniques may be used to reconstruct the individual signals encoded on the multiple modes of the FMF.

Tx module 415 may include one or more components associated with generating and/or providing an optical signal, such as optical transmitters, waveguides, multiplexers, combiners, switches, or the like. Each optical transmitter of Tx module 415 may receive one or more data channels, modulate the one or more data channels with optical signals, and transmit the one or more data channels as optical signals. In some implementations, Tx module 415 may include multiple optical transmitters. In some implementations, each optical transmitter may be tuned to use an optical carrier of a designated wavelength.

The number of components and devices shown in FIG. 4 are provided as an example. In practice, there may be additional components and/or devices, fewer components and/or devices, different components and/or devices, or differently arranged components and/or devices than those shown in FIG. 4. Furthermore, two or more components/devices shown in FIG. 4 may be implemented within a single component/device, or a single component/device shown in FIG. 4 may be implemented as multiple, distributed components/devices. Additionally, one or more of the components/devices of environment 400 may perform one or more functions described as being performed by another of the one or more components/devices of environment 400.

Implementations described herein provide a WSS, for use with FMF, that provides decreased degradation of spectral resolution in the WSS (e.g., as compared to a prior WSS that directly uses a FMF that is multi-mode in two dimensions) while allowing for a reduced switching angle requirement and/or a reduced optics height (e.g., as compared to a prior WSS that uses SMFs or single-mode waveguides to carry individual broken-out fiber modes).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A wavelength selective switch (WSS), comprising:
a front-end unit comprising:
an input few-mode fiber (FMF) providing an input optical signal comprising multiple wavelengths, the multiple wavelengths each having N modes;
two or more output few-mode fibers (FMFs); and
a side of the front-end unit having a 1×N port for each of the input FMF and the two or more output FMFs,
each of the 1×N ports being single mode in a wavelength dispersion dimension and N-mode in a switching dimension,
the switching dimension being perpendicular to the wavelength dispersion dimension, and the switching dimension and the wavelength dispersion dimension being perpendicular to a direction of propagation of the input optical signal
a height of each 1×N port in the switching dimension being less than $((N-1)\times 4\omega)+2\omega$, where $\omega$ is equal to a mode radius of a single-mode input with a same numerical aperture; and
a switching element to:
receive the input optical signal from the front-end unit;
switch each of the multiple wavelengths of the input optical signal to form one or more output optical signals; and
direct each of the one or more output optical signals to a corresponding 1×N port of the front-end unit.

2. The WSS of claim 1, where a height of each 1×N port in the switching dimension is approximately equal to $1.3\omega \times (N-1)+2\omega$.

3. The WSS of claim 1, where a width of each 1×N port in the wavelength dispersion dimension is approximately equal to $2\omega$.

4. The WSS of claim 1, where the front-end unit comprises mode converters for each of the input FMF and the two or more output FMFs,
where the side of the front-end unit comprises ends of each of the mode converters,
where each end has a 1×N port of the 1×N ports.

5. The WSS of claim 4, where each mode converter includes a set of waveguides,
where, along a length of each mode converter, the set of waveguides merge to form a single rectangular waveguide that provides the 1×N port at the end of the mode converter.

6. The WSS of claim 4, where each mode converter includes a single waveguide,
where, along a length of each mode converter, the single waveguide is altered to form a waveguide that provides the 1×N port.

7. The WSS of claim 4, where each mode converter includes a series of diffractive elements.

8. A wavelength selective switch (WSS), comprising:
a front-end unit comprising:
two or more input few-mode fibers (FMFs) providing two or more input optical signals,
each input optical signal comprising multiple wavelengths, where the multiple wavelengths each have N modes;
at least one output few-mode fiber (FMF); and
a side of the front-end unit having a 1×N port for each of the two or more input FMFs and the at least one output FMF,
each of the 1×N ports being single mode in a wavelength dispersion dimension and N-mode in a switching dimension,
a height of each 1×N port in the switching dimension being less than $((N-1)\times 4\omega)+2\omega$, where $\omega$ is equal to a mode radius of a single-mode input with a same numerical aperture; and
a switching element to:
receive the two or more input optical signals from the front-end unit;
switch each of the multiple wavelengths of the two or more input optical signals to form one or more output optical signals; and
direct each of the one or more output optical signals to a corresponding 1×N port of the front-end unit.

9. The WSS of claim 8, where a height of a 1×N port, of the 1×N ports, is approximately equal to $1.3\omega \times (N-1)+2\omega$.

10. The WSS of claim 8, where a width of a 1×N port, of the 1×N ports, is approximately equal to $2\omega$,
where the width is in the wavelength dispersion dimension.

11. The WSS of claim 8, where the front-end unit comprises mode converters for each of the two or more input FMFs and the at least one output FMF,
where the side of the front-end unit comprises ends of each of the mode converters,
where each end has a 1×N port of the 1×N ports.

12. The WSS of claim 8, where a distance between a first 1×N port, associated with an input FMF of the two or more input FMFs, and a second 1×N port, associated with an output FMF of the at least one output FMF, is greater than or equal to approximately three times a mode radius of a single-mode input with a same numerical aperture.

13. The WSS of claim 11, where a mode converter, of the mode converters, includes a set of waveguides,
where, along a length of the mode converter, the set of waveguides merge to form a single rectangular waveguide that provides the 1×N port at the end of the mode converter.

14. The WSS of claim 11, where a mode converter, of the mode converters, includes a single waveguide,
where, along a length of the mode converter, the single waveguide is altered to form a waveguide that provides the 1×N port.

15. A wavelength selective switch (WSS), comprising:
a front-end unit comprising:
an input fiber providing an input optical signal comprising multiple wavelengths,
where the multiple wavelengths each have N modes;
at least two output fibers; and
the front-end unit having a 1×N port for each of the input fiber and the at least two output fibers,
each of the 1×N ports being single mode in a wavelength dispersion dimension and N-mode in a switching dimension a height of each 1×N port in the switching dimension being less than $((N-1)\times 4\omega)+2\omega$, where $\omega$ is equal to a mode radius of a single-mode input with a same numerical aperture; and a switching element to:
receive the input optical signal from the front-end unit;
switch each of the multiple wavelengths of the input optical signal to form one or more output optical signals; and
direct each of the one or more output optical signals to a corresponding 1×N port.

16. The WSS of claim 15, where the input fiber and the at least two output fibers are few-mode fibers.

17. The WSS of claim 15, where a height of a 1×N port, of the 1×N ports, in the switching dimension is approximately equal to $1.3\omega\times(N-1)+2\omega$.

18. The WSS of claim 15, where a width of a 1×N port, of the 1×N ports, in the wavelength dispersion dimension is approximately equal to $2\omega$.

19. The WSS of claim 15, where the front-end unit comprises mode converters for each of the input fiber and the at least two output fibers,
where each of the mode converters has a 1×N port of the 1×N ports.

20. The WSS of claim 19, where at least one mode converter, of the mode converters, includes one or more waveguides or a series of diffractive elements.

* * * * *